United States Patent
Martini et al.

(10) Patent No.: US 9,654,500 B2
(45) Date of Patent: May 16, 2017

(54) WEB REDIRECTION FOR CONTENT FILTERING

(71) Applicant: iBoss, Inc., San Diego, CA (US)

(72) Inventors: Paul Michael Martini, San Diego, CA (US); Peter Anthony Martini, San Diego, CA (US)

(73) Assignee: iboss, Inc., San Diego, CA (US)

(*) Notice: Subject to any disclaimer, the term of this patent is extended or adjusted under 35 U.S.C. 154(b) by 0 days.

(21) Appl. No.: 14/812,984

(22) Filed: Jul. 29, 2015

(65) Prior Publication Data

US 2016/0036831 A1    Feb. 4, 2016

Related U.S. Application Data

(60) Provisional application No. 62/031,080, filed on Jul. 30, 2014.

(51) Int. Cl.
| | |
|---|---|
| *G06F 11/00* | (2006.01) |
| *H04L 29/06* | (2006.01) |
| *H04L 29/08* | (2006.01) |
| *G06F 21/53* | (2013.01) |
| *G06F 17/30* | (2006.01) |
| *H04W 12/08* | (2009.01) |

(52) U.S. Cl.
CPC ...... *H04L 63/145* (2013.01); *G06F 17/30887* (2013.01); *G06F 21/53* (2013.01); *H04L 63/0227* (2013.01); *H04L 63/1416* (2013.01); *H04L 67/02* (2013.01); *H04L 67/2814* (2013.01); *H04L 67/2842* (2013.01); *H04L 67/42* (2013.01); *H04W 12/08* (2013.01)

(58) Field of Classification Search
CPC ............... H04L 63/145; H04L 63/0227; H04L 67/2814; G06F 17/30887
See application file for complete search history.

(56) References Cited

U.S. PATENT DOCUMENTS 5,835,943 A    11/1998  Yohe
5,860,158 A    1/1999   Pai
(Continued)

OTHER PUBLICATIONS

Young, International Search Report, International Application No. PCT/US15/42980 dated Oct. 30, 2015, 11 pages.

(Continued)

*Primary Examiner* — Techane Gergiso
(74) *Attorney, Agent, or Firm* — Fish & Richardson P.C.

(57) ABSTRACT

This specification generally relates to using redirect messages to implement content filtering. One example method includes determining that access to a network resource should be redirected based at least in part on access behavior associated with the network resource; receiving from a client a first request for the network resource, the first request including an original location of the network resource; sending a redirect response to the client including a modified location for the network resource different than the original location; receiving a second request for the network resource from the client including the modified location; retrieving the network resource from the original location; performing at least one action on the retrieved network resource; and selectively sending the retrieved network resource to the client based at least in part on a result associated with the at least one action.

18 Claims, 4 Drawing Sheets

(56) References Cited

U.S. PATENT DOCUMENTS

| | | | |
|---|---|---|---|
| 5,925,100 A | 7/1999 | Drewry | |
| 5,941,954 A * | 8/1999 | Kalajan | H04L 67/34 709/239 |
| 5,944,780 A | 8/1999 | Chase | |
| 5,987,506 A | 11/1999 | Carter | |
| 6,385,693 B1 | 5/2002 | Gerszberg | |
| 6,438,125 B1 | 8/2002 | Brothers | |
| 6,654,807 B2 | 11/2003 | Farber et al. | |
| 7,349,979 B1 | 3/2008 | Cieslak et al. | |
| 7,636,790 B1 * | 12/2009 | Parker | H04L 29/12047 709/238 |
| 7,925,835 B2 | 4/2011 | Elazary et al. | |
| 8,620,999 B1 * | 12/2013 | L'Heureux | H04L 67/10 709/203 |
| 8,626,876 B1 | 1/2014 | Kokal et al. | |
| 2002/0002622 A1 * | 1/2002 | Vange | G06F 9/5027 709/245 |
| 2002/0083123 A1 * | 6/2002 | Freedman | H04L 29/06 709/203 |
| 2002/0087559 A1 * | 7/2002 | Pratt | G06F 17/30893 |
| 2002/0112121 A1 | 8/2002 | Gerszberg et al. | |
| 2003/0023729 A1 | 1/2003 | Foster | |
| 2003/0041094 A1 | 2/2003 | Lara et al. | |
| 2008/0320225 A1 | 12/2008 | Panzer et al. | |
| 2010/0031160 A1 | 2/2010 | Boyer et al. | |
| 2010/0088335 A1 | 4/2010 | Mimatsu | |
| 2011/0119331 A1 * | 5/2011 | Zhang | H04L 29/12405 709/203 |
| 2011/0252117 A1 * | 10/2011 | Sng | H04L 63/029 709/219 |
| 2011/0258526 A1 | 10/2011 | Supakkul et al. | |
| 2011/0282927 A1 * | 11/2011 | Arsenault | H04L 67/2814 709/201 |
| 2011/0295936 A1 | 12/2011 | Gill et al. | |
| 2011/0307622 A1 | 12/2011 | Williams | |
| 2012/0011567 A1 | 1/2012 | Cronk et al. | |
| 2012/0096106 A1 | 4/2012 | Blumofe et al. | |
| 2012/0117239 A1 | 5/2012 | Holloway et al. | |
| 2012/0203861 A1 | 8/2012 | Flack et al. | |
| 2012/0239537 A1 | 9/2012 | Baker et al. | |
| 2012/0239785 A1 | 9/2012 | Pazos | |
| 2012/0324113 A1 * | 12/2012 | Prince | H04L 67/2814 709/226 |
| 2013/0103785 A1 * | 4/2013 | Lyon | H04N 21/2385 709/217 |
| 2013/0151552 A1 * | 6/2013 | Sugawara | G06F 17/30899 707/769 |
| 2013/0191814 A1 | 7/2013 | Fujii et al. | |
| 2013/0339529 A1 * | 12/2013 | Rizzo | H04L 67/322 709/226 |
| 2014/0007239 A1 | 1/2014 | Sharpe et al. | |
| 2014/0025770 A1 * | 1/2014 | Warfield | G06F 15/17331 709/213 |
| 2014/0201323 A1 * | 7/2014 | Fall | H04L 67/10 709/217 |
| 2015/0012584 A1 * | 1/2015 | Lo | H04L 67/2814 709/203 |

OTHER PUBLICATIONS

Young, International Search Report, International Application No. PCT/US15/42974 dated Oct. 29, 2015, 11 pages.

Configuring Web Cache Services Using WCCP, http://www.cisco.com/c/en/us/td/docs/ios/12_2/configgun/configuration/guide/ffun_c/fcf018.html, Jun. 2, 2014, 7 pages.

Configuring WCCP, Cisco Systems, Inc., Nov. 16, 2011, 34 pages.

Redirect caching deep dive, http://www.stevesouders.com/blog/2010/07/23/redirect-caching-deep-dive/, Jul. 23, 2010, 2 pages.

* cited by examiner

FIG. 4

WEB REDIRECTION FOR CONTENT FILTERING

CROSS REFERENCE TO RELATED APPLICATIONS

This application claims the benefit of U.S. Provisional Patent Application No. 62/031,080, filed Jul. 30, 2014, which is hereby incorporated by reference.

BACKGROUND

This specification generally relates to using redirect messages to implement content filtering.

The Internet is a global network of computers that provide information, such as web pages, to clients in response to requests. In some cases, this provided information may be cached in a location that can be accessed more quickly by clients than the computer that provided the information, such as a cache server. Subsequent requests for the same information may be fulfilled by the cache server rather than the remote computer, which may lead to the information being returned to the client faster.

Details of one or more implementations of the subject matter described in this specification are set forth in the accompanying drawings and the description below. Other features, aspects, and potential advantages of the subject matter will become apparent from the description, the drawings, and the claims.

SUMMARY

In one aspect, a computer-implemented method is executed by one or more processors. The method includes determining that access to a network resource should be redirected based at least in part on access behavior associated with the network resource. The method further includes after determining that access to the network resource should be redirected, receiving from a client a first request for the network resource, the first request including an original location of the network resource. The method further includes sending a redirect response to the client including a modified location for the network resource different than the original location. The method further includes receiving a second request for the network resource from the client, the second request including the modified location. The method further includes, in response to receiving the second request for the network resource from the client retrieving the network resource from the original location; performing at least one action on the retrieved network resource; and selectively sending the retrieved network resource to the client based at least in part on a result associated with the at least one action.

Implementations can include any, all, or none of the following features. Performing at least one action on the retrieved network resource includes scanning the retrieved network resource for malicious content, and selectively sending the retrieved network resource to the client includes determining that the retrieved network resource does not include malicious content; and sending the retrieved network resource to the client in response to determining that the retrieved network resource does not include malicious content. Scanning the retrieved network resource for malicious content includes scanning the retrieved network resource for viruses. The retrieved network resource is an executable program, and wherein performing at least one action on the retrieved network resource includes executing the retrieved network resource in a virtual environment, and selectively sending the retrieved network resource to the client includes determining that the retrieved network resource is suitable to send to the client based at least in part on an observed behavior of the retrieved network resource during execution; and sending the retrieved network resource to the client in response to determining that the retrieved network resource is suitable. Performing at least one action on the retrieved network resource includes storing the retrieved network resource, and selectively sending the retrieved network resource to the client includes sending the retrieved network resource to the client in response to storing the retrieved network resource. The access behavior associated with the network resource includes an access frequency for the network resource, and determining that access to the network resource should be redirected is based at least in part on determining that the access frequency is greater than a threshold access frequency. The access behavior associated with the network resource includes detection of an attempt to access a prohibited network resource, and determining that access to the network resource should be redirected is based at least in part on the detection of the attempt to access the prohibited network resource. Receiving the first request for the network resource includes receiving an Hypertext Transfer Protocol (HTTP) GET request, and the original location for the network resource includes a Uniform Resource Locator (URL) for the network resource.

BRIEF DESCRIPTION OF THE DRAWINGS

Like reference numbers and designations in the various drawings indicate like elements.

DETAILED DESCRIPTION

The present disclosure generally relates to techniques for using redirection of client requests to perform various types of applications on the requested content, such as, for example, caching, content scanning, and content filtering. Many network protocols, such as Hypertext Transfer Protocol (HTTP), include redirection mechanisms allowing a server to instruct a client to fetch requested content from an alternate location, such as a different server identified by a different Uniform Resource Locator (URL). The present techniques selectively utilize these redirection mechanisms to direct client requests to a separate system that retrieves the requested content on behalf of the client. This configuration allows the requested content to be analyzed, filtered, cached, or other actions to be performed on the separate server before returning the requested content to the requesting client.

The techniques described herein may provide several advantages. By using widely supported and well-known redirection mechanisms of standard protocols rather than custom protocols, the techniques described herein may be more widely applicable than previous techniques. The techniques also may allow for more flexible and configurable implementations of the various applications using redirection by allowing the decision to redirect to be made by a network management system rather than based on local rules stored at the client, or based on configuration specific to a particular application.

Figure 1:
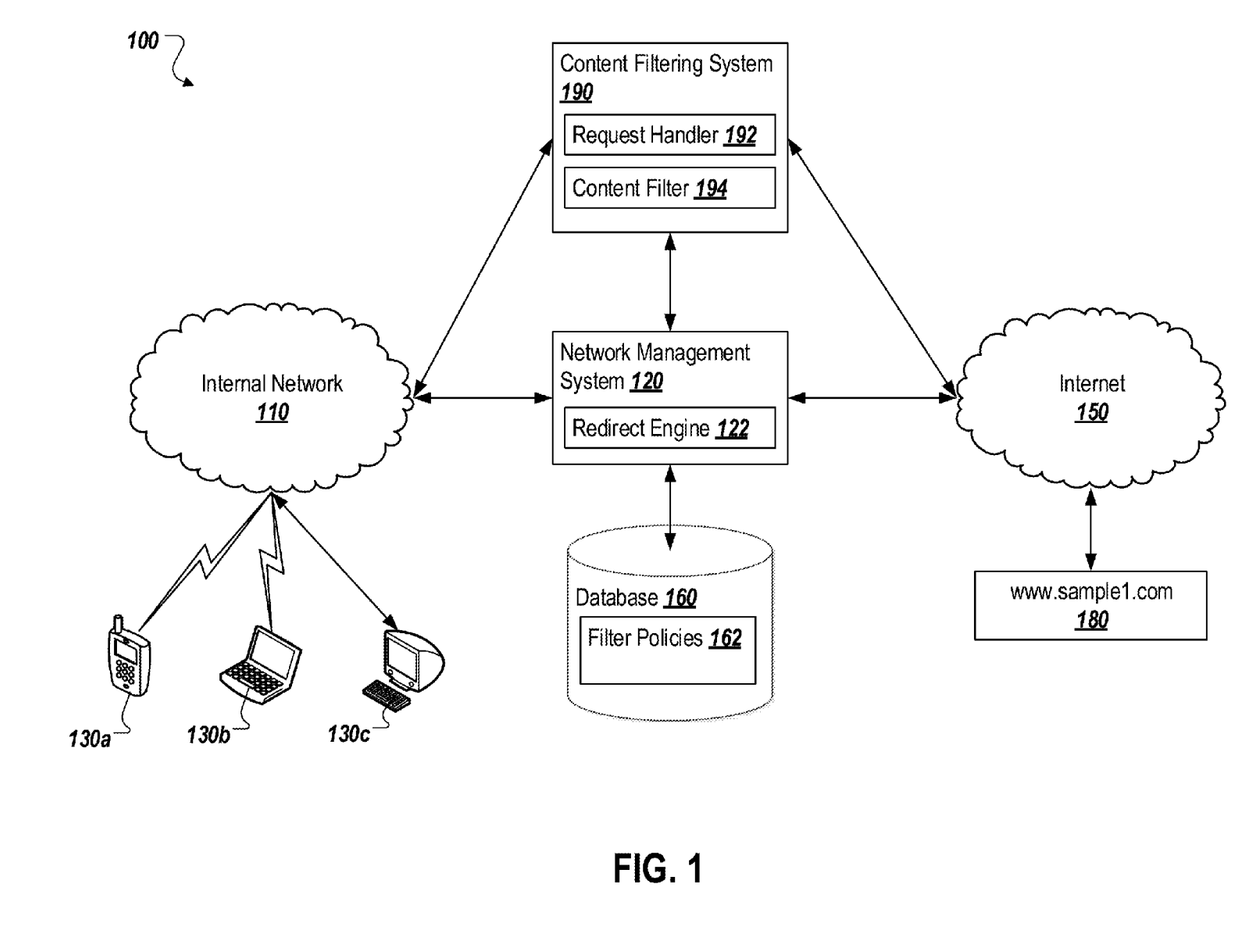
FIG. 1 is a diagram of an example environment.

FIG. 1 is a diagram of an example environment 100. As shown, the example environment includes one or more devices 130a-c connected to an internal network 110. A network management system 120 and a content filtering system 190 also connected to the internal network 110. Network management system 120 is connected to a database 160. The content filtering system 190 and the network management system 120 are connected to the Internet 150. A website 180 is connected to the Internet 150. In operation, one of the devices 130a-c may send a request to the website 180 via the internal network 110. For example, a device may send an HTTP GET request including the URL of the resource hosted by the website 180. Network management system 120 may intercept the request, and determine that the request is configured to have content filtering applied. The network manager system 120 may send a redirect message to the requesting device directing the device to the content filtering system 190. For example, the network management system 120 may send an HTTP response indicating that a redirect should occur including a new URL for the device to request. The new URL may identify the content filtering system 190, and may include an indication of the original URL that was requested. The requesting device may then send another request for the website 180 through the content filtering system 190. The content filtering system 190 may retrieve a copy of the requested website 180 or determine that it has cached a stored copy of the response to the request. If not cached, the content filtering system 190 may forward the request to the website 180 via the Internet 150. The website 180 may respond to the request with a response, such as, for example, a webpage or other resource specified in the request. The content filtering system 190 may receive this response from the website 180, optionally store the response so that it may respond to future requests with the stored copy, and apply one or more content filters to the website 180. The content filtering system 190 may analyze content retrieved from the website 180 to determine, based on content filtering policies 162, whether the content is suitable for delivery to the client. The content filtering system 190 may then return the filtered website 180 in a response to the requesting device over the internal network 110 if the content is deemed suitable based on the analysis.

As shown, the environment 100 includes an internal network 110. In some implementations, the internal network 110 may be a wireless network provided by a corporation, educational institution, municipality, business, or other entity. Such a wireless network may utilize any standard wireless networking technology, including 802.11a, 802.11b, 802.11g, 802.11n, LTE, WiMax, CDMA or any other suitable wireless networking technology. In such implementations, the wireless network may be a public network in the sense that any device within range may connect to the network. Even though any device within range may connect to the internal network 110 in such configurations, the device still may be required to authenticate in order to access resources on the internal network 110 and/or on the Internet 150. Such a configuration is often referred to as a Bring Your Own Device (BYOD) network in which users are free to use their own personal devices for connecting to the network. In some implementations, the entity that controls the internal network 110 may issue devices to users for use on the internal network 110. The internal network 110 may also be a wired network, such as an Ethernet network.

Environment 100 also includes one or more devices 130a-c. In some implementations, the one or more devices 130a-c include mobile devices, such as cellular telephones (e.g., 130a), smartphones, tablets, laptops (e.g., 130b) and other similar computing devices. The one or more devices 130a-c may also include wired devices such as desktop computer 130c. The one or more devices 130a-c may also include servers. In some implementations, the one or more devices 130a-c include personal devices associated with one or more users. The one or more devices 130a-c may also include devices issued or owned by the entity that provides the internal network 110, such as company-issued smartphones or laptops. In some implementations, the one or more devices 130a-c may include network access or web browsing software (e.g., a web browser) for accessing resources on the Internet 150.

In some implementations, the devices 130a-c may include networking software configured to request websites from the Internet 150. For example, the devices 130a-c may include web browser software allowing a user to browse websites on the Internet 150. The web browser software may send requests for various resources from the websites, including, but not limited to, webpages, images, videos, software programs, files, and other types of resources. In some cases, the devices 130a-c may send requests and receive responses using the HTTP protocol. The devices 130a-c may also sin request and receive responses according to other network protocols, including, but not limited to, File Transfer Protocol (FTP), Simple Object Access Protocol (SOAP), Remote Procedure Call (RPC), or other protocols.

In some cases, the devices 130a-c may be configured to access the Internet 150 through the network management system 120, such as, for example, by the network management system 120 be configured as the default gateway to access the Internet 150. Devices 130a-c may also be configured to access the network management system 120 as a proxy server. In some implementations, the devices 130a-c may access the Internet 150 through a separate gateway (not shown), and the network management system 120 may passively monitor the requests and responses.

The environment 100 includes a network management system 120. In some implementations, the network management system may be a server or set of servers connected to the internal network 110. The network management system may be configured as a gateway between the internal network 110 and the Internet 150, such that traffic directed to the Internet 150 passes through the network management system 120. The network management system 120 may also be configured to passively monitor traffic on the internal network 110, such as in a tap or span configuration. In some implementations, the network management system 120 may receive part of the traffic directed to the Internet 150, such that certain traffic passes through the network management system 120, and other traffic does not pass through the network management system 120. In some implementations, the DNS functionality and the monitoring functionality of the network management system 120 may be implemented on separate servers in communication and coordination with one another.

The network management system 120 includes a redirect engine 122. In operation, the redirect engine 122 identifies requests from the devices 130a-c for resources on the Internet 150. The redirect engine 122 may determine that a response to a particular request is configured to be filtered, such as by consulting filter policies 162 stored in the database 160. The redirect engine 122, in response to determining that a request is configured to be filtered, may send a redirect response to the requesting device instructing the device to resend its request to the content filtering system 190.

For example, the device 130a may send an HTTP GET request over the internal network 110 directed to the website 180. The HTTP GET request may include the URL "www.sample1.com/hello.gif," indicating that the request is for an image named "hello.gif" from the website 180. The network management system 120 may receive HTTP GET request from the internal network 110. The redirect engine 122 may parse the HTTP GET request, and determine that the request should be redirected to the content filtering system 190. In some cases, the determination may be made based on the filter policies 162, which are described in greater detail below. In response to determining that the request should be redirected, the redirect engine 122 generates an HTTP redirect response including a URL associated with the content filtering system 190 (e.g., "filter.com"). In some cases, the URL may also include the URL from the original HTTP GET request (e.g., "http://filter.com/r?url=www.sample1.com/hello.gif"). This may allow the content filtering system 190 to determine what resource the device 130a is requesting.

In some implementations, the HTTP redirect response generated by the redirect engine 122 may be a "307 temporary redirect" response including the URL, which may be formatted as follows:

```
HTTP/1.1 307 temporary redirect
Refresh:0;url=http://filter.com/r?url=www.sample1.com/hello.gif
```

The first line of the response includes a version indicator ("HTTP/1.1") and a response code ("307 temporary redirect"). The second line of the response includes a refresh header indicating that the device should request the URL "http://filter.com/r?url=www.sample1.com/hello.gif" after a delay of zero seconds. In some cases, HTTP redirect response generated by the redirect engine 122 may be a "200 OK" response including a refresh header.

In some cases, the redirect engine 122 may return a Hypertext Markup Language (HTML) document including an HTML meta-tag redirecting the browser to a new URL, as shown in the following example:

```
<html>
<head>
<meta http-equiv="Refresh" content="0; url=
http://fliter.com/r?url=www.sample1.com/hello.gif " />
</head>
<body>
<p>Please follow <a href="
http://filter.com/r?url=www.sample1.com/hello.gif ">this
link</a>.</p>
</body>
</html>
```

The tag "<meta http-equiv="Refresh">" instructs a browser rendering the HTML to immediately request the specified URL. In some implementations, the redirect engine 122 may use additional techniques to cause the device 130a to request a different URL, including, but not limited to, a "302 found" response, a "301 moved permanently" response, a "303 see other" response, other HTTP responses including a refresh header, or other techniques.

The environment 100 also includes a database 160. In some implementations, the database 160 may be stored on the same server as the network monitoring system 120. The database 160 may also be stored on a separate server and accessed by the network monitoring system 120 over a network. The database 160 may be any proprietary or commercially available database system or format, including, but not limited to, MySQL®, Microsoft® SQLServer, IBM® DB2, Oracle®, SQLite, or any other suitable database system or format. The database 160 may also be a distributed database running on a plurality of servers. In some implementations, the database 160 may be a configuration file or set of configuration files associated with the network monitoring system 120.

The database 160 may include configuration information specifying to the network management system 120 which requests should be redirected to the content filtering system 190. The configuration information may include filter policies 162, or other configuration information related to content scanning, content filtering, or other applications. The configuration information may specify particular network addresses, domain names, request types, requested resource types (e.g., file types by extension), or other criteria indicating requests that should be redirected to the content filtering system 190.

Environment 100 includes the content filtering system 190. In operation, the content filtering system 190 may receive requests from the devices 130a-c set in response to the redirect from a network manager system 120. The content filtering system 190 may handle these requests differently based on the type of application that is configured. For example the content filtering system 190 may determine whether a resource specified in the request should have content filtering applied. If the resource should have content filtering applied, the content filtering system 190 may retrieve the resource from the Internet 150, apply content filtering, and return the resource to the requesting device.

In some cases, the content filtering system 190 may retrieve the requested resource from the Internet 150, and perform analysis on it to determine whether it is suitable to provide to the requesting device. For example, the content filtering system 190 may perform a virus scan on the requested resource, and may determine that the resource is suitable to provide to the requesting device based on the results of the virus scan (e.g., the resource is suitable if no viruses are detected).

In some implementations, the content filtering system 190 may retrieve the requested resource from the Internet 150, and perform one or more actions on the retrieved resource. For example, the content filtering system 190 may, where the retrieved resource is an executable program, initialize the virtual environment and execute the program to analyze behavior. The content filtering system 190 may selectively return this retrieved resource to the requesting device based on the results of the one or more actions.

Figure 2:
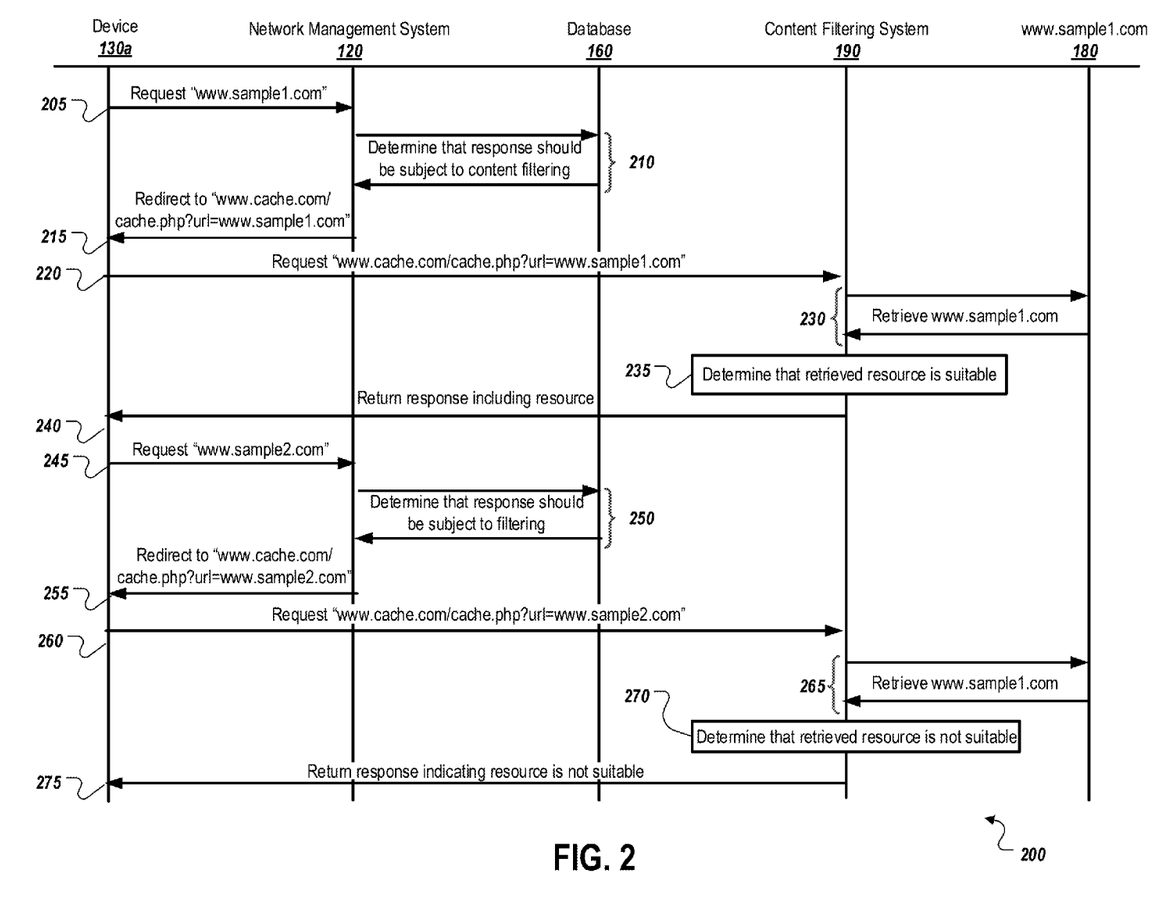
FIG. 2 is a message flow diagram of an example interaction between the components of the example environment to implement content filtering using redirect messages.

FIG. 2 is a message flow diagram of an example interaction 200 between the components of the example environment to implement content filtering using redirect messages. At 205, the device 130a sends a request for resource with the URL "www.sample1.com." In other examples, other of the devices 103a-c could be used instead. In some cases, the request is an HTTP GET request. The request may also be formatted according to other network protocols, such as those described herein.

At 210, the network management system 120 interacts with the database 160 to determine that a response to the request should be subject to content filtering. For example, the network management system 120 may query and examine the filter policies 162 to determine whether the request should be filtered, as described previously relevant FIG. 1.

At 215, the network management system 120 redirects the device 130a to an alternate URL associated with the content filtering system 190. In some cases, this alternate URL may reference a resource on the content filtering system 190 configured to perform the caching behavior. The alternate URL may also include the original URL requested by the device 130a at 205. In some cases, the network management system 120 redirects the device 130a by sending an HTTP redirect response. The redirect response may also be formatted according to other network protocols, such as those described herein.

At 220, the device 130a sends a second request for the alternate URL to the content filtering system 190. In some implementations, the device 130a may perform a DNS lookup on a domain name included in the alternate URL to determine the address of the content filtering system 190. At 230, the content filtering system 190 retrieves the requested resource from the website 180 denoted by the domain name "www.sample1.com." At 235, the content filtering system 190 determines that the retrieved resource is suitable for sending to the device 130a. At 240, the content filtering system 190 returns the response received from the website 180 to device 130a.

At 245, the device 130a sends an additional request for the same resource requested at 205. At 250, the network management system 120 consults the database 160 to determine that the response to the request should be filtered. At 255, the network management system 120 redirects the device 130a to the alternate URL.

At 260, the device 130a requests the alternate URL from the content filtering system 190. At 265, the content filtering system 190 retrieves the requested resource from the website 180 denoted by the domain name "www.sample1.com." At 270, the content filtering system 190 determines that the retrieved resource is not suitable for sending to the device 130a. At 275, the content filtering system 190 returns a response to the device 130a indicating that the resource is not suitable.

Figure 3:
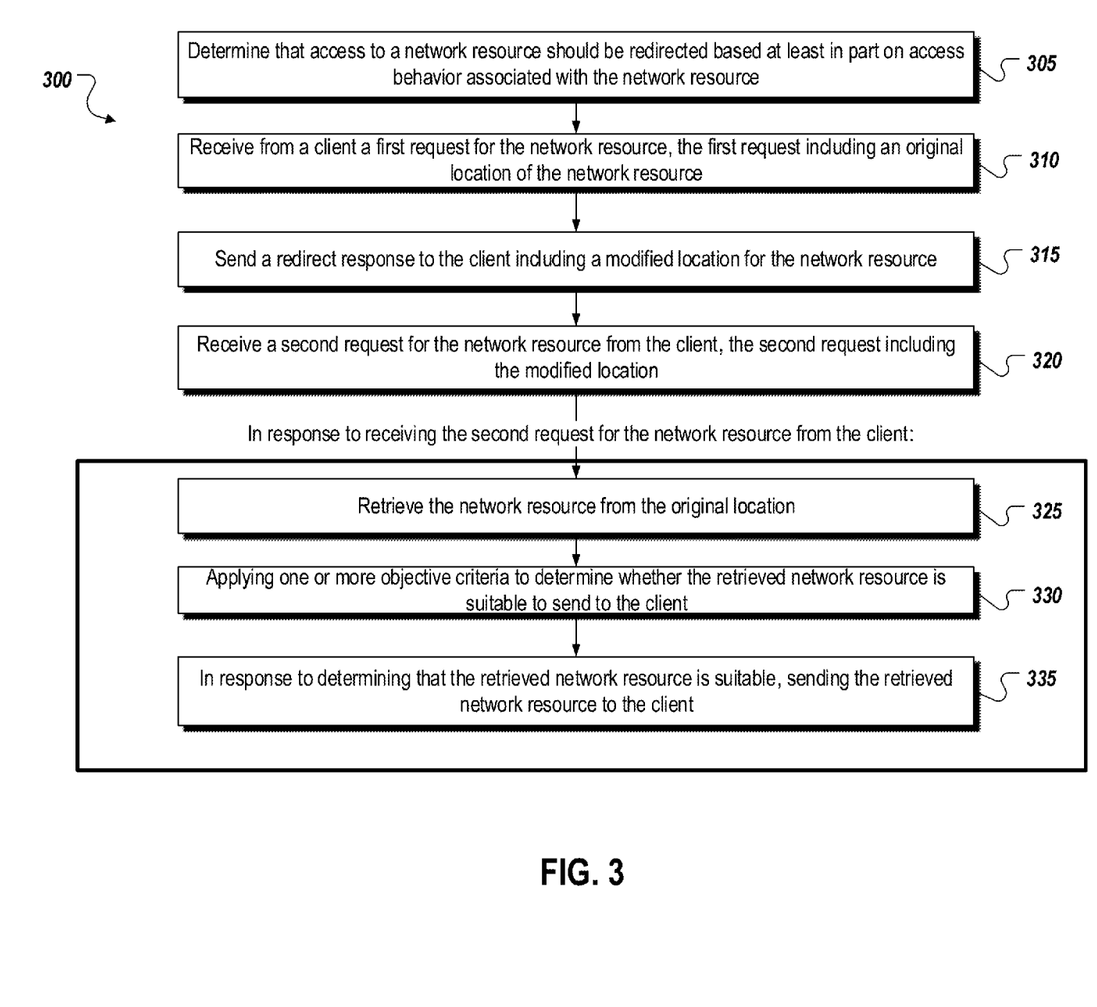
FIG. 3 is a flow chart of an example process of using redirect messages to filter content.

FIG. 3 is a flow chart of an example process of using redirect messages to implement content analysis and filtering. At 305, access to a network resource is determined to be redirected based at least in part on access behavior associated with the network resource. In some cases, access behavior associated with the network resource includes an access frequency for the network resource, and determining that access to the network resource should be redirected is based at least in part on determining that the access frequency is greater than a threshold access frequency. In some cases, access behavior associated with the network resource includes detection of an attempt to access a prohibited network resource, and determining that access to the network resource should be redirected is based at least in part on the detection of the attempt to access the prohibited network resource.

At 310, a first request for the resource is received from a client. The first request includes an original location of the network resource. The first request includes an original location of the network resource. In some implementations, receiving the first request for the network resource includes receiving a Hypertext Transfer Protocol (HTTP) GET request, and the original location for the network resource includes a Uniform Resource Locator (URL) for the network resource.

At 315, a redirect response is sent to the client including a modified location for the network resource. In some cases, sending the redirect response to the client includes sending an HTTP redirect message to the client, and the sent location includes a URL associated with a content filtering server and the URL for the network resource. At 320, a second request for the network resource is received from the client, the second request including the sent location.

Actions 325 through 335 are performed in response to receiving the second request for the network resource from the client. At 325, the network resource is retrieved from the original location. At 330, At least one action is performed on the retrieved network resource. At 335, the retrieved network resource is selectively sent to the client based at least in part on a result associated with the at least one action. For example, the at least one action can include scanning the retrieved network resource for malicious or otherwise inappropriate content (e.g., viruses, malware, advertisements, obscenity, pornography, confidential or restricted content, etc.) and selectively sending the retrieved network resource to the client includes determining that the retrieved network resource does not include malicious content; and sending the retrieved network resource to the client in response to determining that the retrieved network resource does not include malicious content. In another example, the retrieved network resource is an executable program. In this example, performing at least one action on the retrieved network resource includes executing the retrieved network resource in a virtual environment, and selectively sending the retrieved network resource to the client includes determining that the retrieved network resource is suitable to send to the client based at least in part on an observed behavior of the retrieved network resource during execution; and sending the retrieved network resource to the client in response to determining that the retrieved network resource is suitable. In another example, performing at least one action on the retrieved network resource includes storing the retrieved network resource, and selectively sending the retrieved network resource to the client includes sending the retrieved network resource to the client in response to storing the retrieved network resource.

Figure 4:
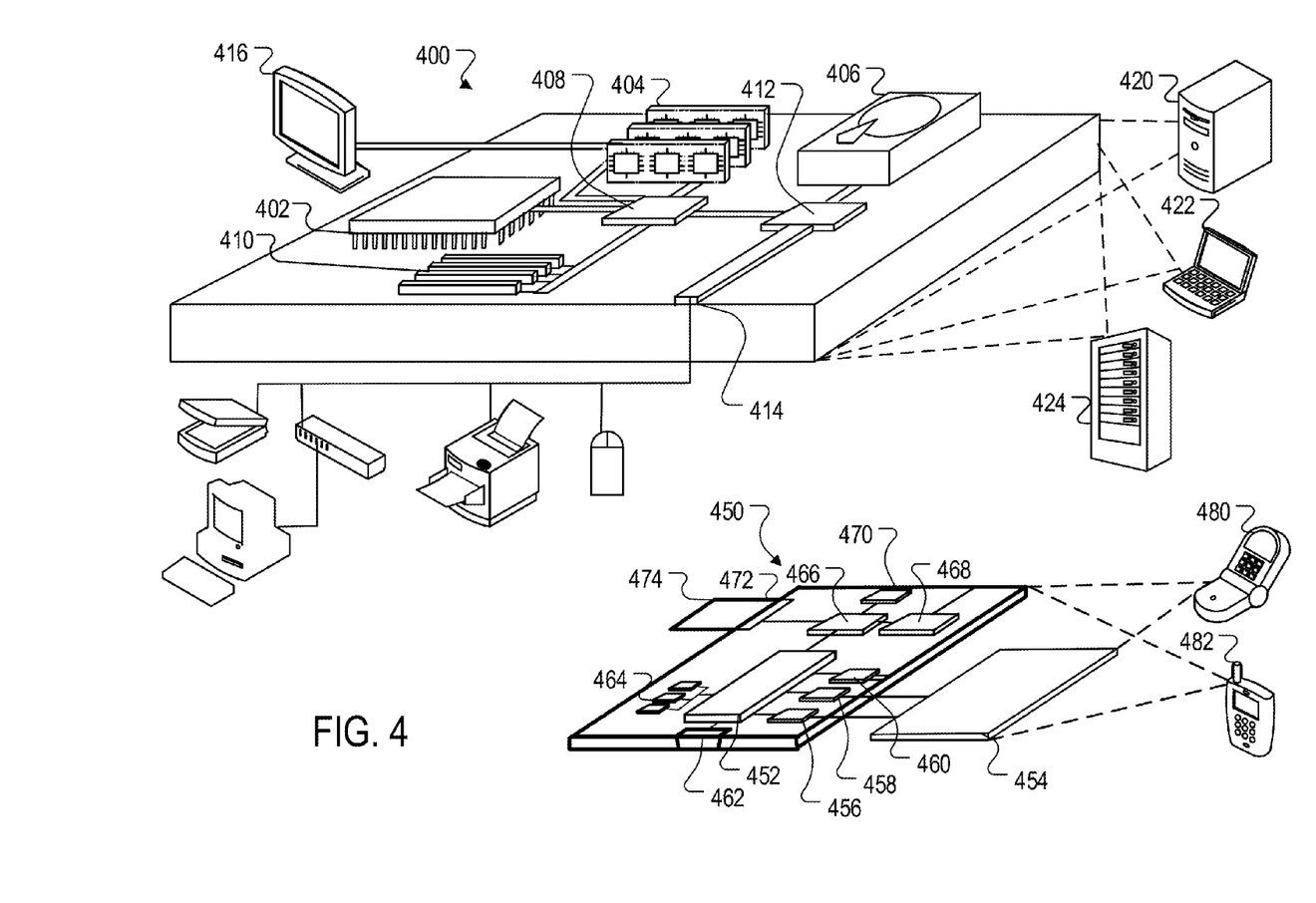
FIG. 4 is a diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low expansion port 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high-speed interface 408 manages bandwidth-intensive operations for the computing device 400, while the low speed interface 412 manages lower bandwidth-intensive operations. Such allocation of functions is exemplary only. In one implementation, the high-speed interface 408 is coupled to memory 404, display 416 (e.g., through a graphics processor or accelerator), and to high-speed expansion ports 410, which may accept various expansion cards (not shown). In the implementation, low speed interface 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 452 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method executed by one or more processors, the method comprising:
   receiving from a client a first request for a network resource, the first request including an original location of the network resource;
   determining that the requested network resource is to be analyzed for selective filtering before making the requested network resource available to the client;
   in response to the determining that the requested network resource is to be analyzed for selective filtering before making the requested network resource available to the client:
      sending a redirect response to the client including a modified location for the network resource different than the original location;
      receiving from the client a second request for the network resource, the second request including the modified location;
      in response to receiving from the client the second request for the network resource, performing a selective filtering analysis by:
         retrieving the network resource from the original location, wherein the retrieved network resource is an executable program;
         applying one or more objective criteria to determine whether the retrieved network resource is to be sent to the client before sending the retrieved network resource to the client, wherein determining that the retrieved network resource is to be sent to the client includes executing the retrieved network resource in a virtual environment, and wherein the determination is based at least in part on an observed behavior of the retrieved network resource during execution; and in response to determining that the retrieved network resource is to be sent to the client, sending the retrieved network resource to the client;

receiving from the client a third request for a second network resource;

determining that the requested second network resource is not to be analyzed for selective filtering before making the requested second network resource available to the client; and routing the third request to the requested second network resource in response to the determining that the requested second network resource is not to be analyzed for selective filtering before making the requested network resource available to the client.

2. The method of claim 1, wherein determining that the retrieved network resource is to be sent to the client includes:

scanning the retrieved network resource for malicious content, wherein the determination is based at least in part on a result of the scanning.

3. The method of claim 2, wherein scanning the retrieved network resource for malicious content includes scanning the retrieved network resource for at least one of viruses, malware, advertisements, obscenity, pornography, confidential content and restricted content.

4. The method of claim 1, wherein the network resource is a first network resource, the method further comprising:

receiving a first request for a second network resource different than the first network resource from the client, the request including an original location for the second network resource;

sending a redirect response to the client including a modified location for the second network resource;

receiving a second request for the second network resource from the client, the second request including the modified location;

in response to receiving the second request for the second network resource from the client:

determining that the retrieved network resource is not to be sent to the client; and sending an indication to the client that the network resource is not being sent to the client.

5. The method of claim 1, wherein receiving the first request for the network resource includes receiving a Hypertext Transfer Protocol (HTTP) GET request, and the original location for the network resource includes a Uniform Resource Locator (URL) for the network resource.

6. The method of claim 1, wherein sending the redirect response to the client includes sending an HTTP redirect message to the client, and the modified location includes a URL associated with an analysis server and the URL for the network resource.

7. The method of claim 1, wherein determining that the retrieved network resource is to be sent to the client includes determining that a domain name associated with the network resource is included in a list of domain names to be analyzed.

8. The method of claim 1, wherein determining that the retrieved network resource is to be sent to the client is based at least in part on a domain name included in the original location for the network resource.

9. The method of claim 1, wherein determining that the retrieved network resource is to be sent to the client is based at least in part on a resource type associated with the network resource.

10. The method of claim 9, wherein the resource type is one of a video file, an archive file, an executable file, or an image file.

11. The method of claim 9, wherein the resource type associated with the network resource is determined based on a file extension included in the original location.

12. The method of claim 1, wherein determining that the retrieved network resource is to be sent to the client is based at least in part on a category associated with the network resource.

13. The method of claim 1, wherein the client is a first client, the method further comprising:

receiving a fourth request for the network resource from a second client, the fourth request including the original location for the network resource;

sending a redirect response to the second client including the modified location for the network resource;

receiving a fifth request for the network resource from the second client, the fifth request including the modified location;

in response to receiving the fourth request for the network resource from the second client:

determining that the network resource has been previously determined to be sent to the client; and sending a stored version of the network resource to the second client.

14. A non-transitory, computer-readable medium storing instructions operable when executed to cause at least one processor to perform operations comprising:

receiving from a client a first request for a network resource, the first request including an original location of the network resource;

determining that the requested network resource is to be analyzed for selective filtering before making the requested network resource available to the client;

in response to the determining that the requested network resource is to be analyzed for selective filtering before making the requested network resource available to the client:

sending a redirect response to the client including a modified location for the network resource different than the original location;

receiving from the client a second request for the network resource, the second request including the modified location;

in response to receiving from the client the second request for the network resource, performing a selective filtering analysis by:

retrieving the network resource from the original location, wherein the retrieved network resource is an executable program;

applying one or more objective criteria to determine whether the retrieved network resource is to be sent to the client before sending the retrieved network resource to the client, wherein determining that the retrieved network resource is to be sent to the client includes executing the retrieved network resource in a virtual environment, and wherein the determination is based at least in part on an observed behavior of the retrieved network resource during execution; and in response to determining that the retrieved network resource is to be sent to the client, sending the retrieved network resource to the client;

receiving from the client a third request for a second network resource;

determining that the requested second network resource is not to be analyzed for selective filtering before making the requested second network resource available to the client; and routing the third request to the requested second network resource in response to the determining that the requested second network resource is not to be analyzed for selective filtering before making the requested network resource available to the client.

15. The computer-readable medium of claim 14, wherein determining that the retrieved network resource is to be sent to the client includes:

scanning the retrieved network resource for malicious content, wherein the determination is based at least in part on a result of the scanning.

16. The computer-readable medium of claim 15, wherein scanning the retrieved network resource for malicious content includes scanning the retrieved network resource for viruses, malware, advertisements, obscenity, pornography, confidential content and restricted content.

17. The computer-readable medium of claim 14, wherein the network resource is a first network resource, the operations further comprising:

receiving a first request for a second network resource different than the first network resource from the client, the request including an original location for the second network resource;

sending a redirect response to the client including a modified location for the second network resource;

receiving a second request for the second network resource from the client, the second request including the modified location;

in response to receiving the second request for the second network resource from the client:

determining that the retrieved network resource is not to be sent to the client; and sending an indication to the client that the network resource is not being sent to the client.

18. A system comprising:

memory for storing data; and one or more processors operable to perform operations comprising:

receiving from a client a first request for a network resource, the first request including an original location of the network resource;

determining that the requested network resource is to be analyzed for selective filtering before making the requested network resource available to the client;

in response to the determining that the requested network resource is to be analyzed for selective filtering before making the requested network resource available to the client:

sending a redirect response to the client including a modified location for the network resource different than the original location;

receiving from the client a second request for the network resource, the second request including the modified location;

in response to receiving from the client the second request for the network resource, performing a selective filtering analysis by:

retrieving the network resource from the original location, wherein the retrieved network resource is an executable program;

applying one or more objective criteria to determine whether the retrieved network resource is to be sent to the client before sending the retrieved network resource to the client, wherein determining that the retrieved network resource is to be sent to the client includes executing the retrieved network resource in a virtual environment, and wherein the determination is based at least in part on an observed behavior of the retrieved network resource during execution; and in response to determining that the retrieved network resource is to be sent to the client, sending the retrieved network resource to the client;

receiving from the client a third request for a second network resource;

determining that the requested second network resource is not to be analyzed for selective filtering before making the requested second network resource available to the client; and routing the third request to the requested second network resource in response to the determining that the requested second network resource is not to be analyzed for selective filtering before making the requested network resource available to the client.

* * * * *